United States Patent
Ewals et al.

[11] Patent Number: 5,735,604
[45] Date of Patent: Apr. 7, 1998

[54] TEMPERATURE SENSOR AND TEMPERATURE MEASURING SYSTEM USING THE TEMPERATURE SENSOR

[75] Inventors: Gerardus L. G. Ewals, Venray; Theodorus A. G. Heeren, Venlo, both of Netherlands

[73] Assignee: Océ-Technologies, B.V., Venlo, Netherlands

[21] Appl. No.: 683,390

[22] Filed: Jul. 18, 1996

[30] Foreign Application Priority Data

Jul. 26, 1995 [NL] Netherlands ............ 1000888

[51] Int. Cl.$^6$ .............. G01K 1/14; G01K 13/08; G01K 7/16; G01K 1/16
[52] U.S. Cl. .............. 374/134; 374/141; 374/153; 374/183; 399/69
[58] Field of Search .............. 374/120, 134, 374/135, 141, 153, 183; 399/69

[56] References Cited

U.S. PATENT DOCUMENTS

| | | | |
|---|---|---|---|
| 3,321,974 | 5/1967 | Sterbutzel | 374/134 |
| 3,417,617 | 12/1968 | Rall | 374/135 |
| 5,123,752 | 6/1992 | Paz-Pujalt et al. | 374/153 |
| 5,287,155 | 2/1994 | Arai et al. | 399/69 |

FOREIGN PATENT DOCUMENTS

| | | | |
|---|---|---|---|
| 3220087 | 12/1983 | Germany | 374/135 |
| 3527942 | 2/1987 | Germany | 374/134 |
| 0037792 | 3/1979 | Japan | 374/120 |
| 0075525 | 4/1988 | Japan | 374/120 |
| 73597 | 11/1953 | Netherlands . | |
| WO8100452 | 2/1981 | Sweden . | |
| 2266771 | 11/1993 | United Kingdom | 374/134 |

OTHER PUBLICATIONS

La Technique Moderne, L'Exposition De L'Institute of Physics et de la Physical Society, p. 313, (Jul. 1963).

*Primary Examiner*—Diego F. F. Gutierrez

[57] ABSTRACT

The invention relates to a sensor unit and a temperature measuring system that includes the sensor unit for the contactless determination of the object temperature ($T_v$) of at least a part of an object. The sensor unit is placed near the object and includes a first and second plate. A temperature-sensitive sensor is disposed on each plate to produce first and second sensor signals which represent the temperature of the first and second plates, respectively. The system also includes a control unit which processes the first and second sensor signals in combination for determining the object temperature ($T_v$). Preferably, the control unit employs a Kalman filter. Also, the temperature measuring system is applied to an image reproduction machine to determine the temperature of a roller or belt.

47 Claims, 4 Drawing Sheets

TEMPERATURE SENSOR AND TEMPERATURE MEASURING SYSTEM USING THE TEMPERATURE SENSOR

BACKGROUND OF THE INVENTION

1. Field of the Invention

The invention relates to a temperature sensor unit and to a temperature measuring system for the contactless determination of the object temperature of at least a part of an object. More particularly, the invention relates to a temperature sensor unit having first and second plates which are to be placed near the object and a temperature measuring system that includes a control unit which processes the sensor unit signals for determining the object temperature. The invention also relates to an application of the temperature measuring system in an image reproduction machine.

2. Description of Related Art

Contactless temperature measuring systems are generally known and are used, inter alia, for determining the surface temperature of heated rotating rollers and heated endless belts in image reproduction systems, such as copying machines and printers. In such cases, the surface temperature is equivalent to the object temperature. Here, the temperature measuring system forms part of a measuring and control system for measuring and controlling the object temperature.

One problem which occurs in reproduction systems is that the rotating roller or moving belt may be damaged if the sensor unit comes into contact therewith while measuring the object temperature. The rotating roller or moving belt might be scratched or otherwise affected by this contact. If the attempt is made to measure the object temperature without making contact with the object, the problem arises that the first plate of the sensor unit will generally assume a temperature differing from the object or part of the object. This is due, inter alia, to an unknown heat flow from the first plate to the surroundings. Consequently, the object temperature cannot be determined accurately.

U.S. Pat. No. 5,287,155 proposes measuring the temperature of a first plate at least once when the first plate makes contact with a stationary heated roller and comparing it with a measured temperature of the first plate when it is not in contact with the roller. From these measurements, a differential temperature is determined which is then used as a correction value for the temperature measured when the first plate is not in contact with the roller. The disadvantage of this method, however, is that there is still a risk of damage to the roller when the first plate makes contact with the stationary roller. Even when the roller is not moving it may, for example, be dented by the first plate.

Also, this known method is often not sufficiently accurate, because the correction value may unnoticeably fall-off or change over the course of time, e.g. because of a change in the ambient conditions such as air humidity and ambient temperature.

Another disadvantage of the '155 patent is that a correction value determined when the roller is stationary will generally differ from a correction value that is applicable with the roller moving. The movement of the roller may, for example, cause air to flow near the sensor unit which influences the ambient conditions and, hence, the accuracy of the '155 temperature measuring system.

FIG. 1 shows a known temperature measuring system 1. The temperature measuring system 1 includes a temperature sensor unit 2 which, in this example, is formed by a plate 4 and a temperature-sensitive sensor 6 disposed on the plate 4. In this example, the plate 4 is disposed near an object 8 whose temperature $T_v$ is to be determined by the temperature measuring system 1.

The temperature-sensitive sensor 6 is disposed on the plate 4 and produces sensor signals representing the temperature $T_p$ of the plate 4. These sensor signals are fed via line 10 to the control unit 11 which further processes the sensor signals for determination of the object temperature $T_v$.

The conventional temperature measuring system 1 operates as follows. As shown in FIG. 1, it is assumed that the temperature to be measured (of the object or part thereof) is $T_v$. The ambient temperature of the sensor unit 2 is assumed to be $T_o$. It is also assumed that the plate 4 is made of a material such that the plate will assume the same temperature throughout. The plate 4 is, therefore, made of a material which is a very good thermal conductor, e.g. copper or aluminum. The temperature of the plate 4 is denoted by $T_p$. On the basis of the known first law of thermodynamics, $$C_{Tp} \cdot \frac{dT_p}{dt} = Q_{vp} - Q_{po} \qquad (1)$$

Here $C_{Tp}$ is equal to the thermal capacity of the plate 4, $Q_{vp}$ is equal to the heat flow from the object 8 to the plate 4 and $Q_{po}$ is the heat flow from the plate 4 to the surroundings. It is also assumed that:

$$Q_{vp} = G_{vp}(T_v - T_p) \qquad (2)$$

$$Q_{po} = G_{op}(T_p - T_o) \qquad (3)$$

where $G_{vp}$ represents the thermal conductivity coefficient of the object 8 to the plate 4 and $G_{op}$ the thermal conductivity coefficient from the surroundings to the plate 4. It should be noted that formulae 2 and 3 are based on physical assumptions about the thermodynamic behavior of the system.

Substitution of formulae 2 and 3 and formula 1 gives:

$$C_{Tp} \cdot \frac{dT_p}{dt} = G_{vp}(T_v - T_p) + G_{op}(T_0 - T_p). \qquad (4)$$

Formula 4 is an equation with two unknowns, i.e. $T_v$ and $T_o$. This means that the object temperature $T_v$ cannot be solved directly. Only if it is assumed that the heat transfer coefficient $G_{op}$ is negligible can a stable situation ($dT_p/dt=0$) $T_v=T_p$ be obtained. Generally, however, an assumption of this kind brings a fairly considerable error into the determination of $T_v$. If $T_v$ is of the order of magnitude of 100° C., for example, while the ambient temperature $T_o$ is, for example, 40° C., the error in the determination of $T_v$, i.e. the difference between $T_v$ and $T_p$, will be some degrees C. Such an error is unacceptable. If the object 8 is, for example, a heated roller of a copying machine or a printer, while the temperature measuring system 1 forms part of a measuring and control circuit with which the temperature $T_v$ of the roller 8 is set to a required value, an error of this kind is unacceptably large.

SUMMARY OF THE INVENTION

The object of the invention is to remedy the above disadvantages. To achieve this object, the conventional sensor unit 2 is further provided with a second plate spaced from the first plate and having a second temperature-sensitive sensor disposed thereon to produce second sensor signals representing the temperature ($T_{p2}$) of the second plate.

To further achieve this object, a temperature measuring system including a control unit is provided which processes the first and second sensor signals in combination with one another to determine the object temperature ($T_v$).

Since, according to the invention, a second contactless temperature measurement is carried out by using the second plate, new information is obtained regarding the object temperature, which information is generally at least partially independent of the information obtained with the first plate. This at least partial independence is achieved by the fact that the second plate will occupy a different position with respect to the object as compared with the first plate.

In other words, the second plate is so positioned with respect to the first plate that, if a stable state ratio ($T_o/T_v$) between an ambient temperature ($T_o$) of the sensor unit and the temperature ($T_v$) of the object has a numerator and denominator that differ from one another, the associated ratios ($T_{p1}/T_{p2}$) between the temperature ($T_{p1}$) of the first plate and the temperature ($T_{p2}$) of the second plate also has a numerator and denominator that differ from one another.

Consequently, on the basis of physical considerations, the object temperature can be determined very accurately in a completely contactless manner even if the ambient conditions change. If required, the ambient temperature can also be determined on the basis of the measured temperature of the first plate and the second plate respectively. This latter also implies that the influence of the ambient temperature on the determination of the object temperature can be eliminated.

The independence and hence the accuracy of the temperature measuring system can further be boosted by so constructing the first plate and the second plate that they have different dimensions from one another.

According to a particular embodiment of the temperature measuring system according to the invention, the first and second plates each include an inner surface and an outer surface which are situated opposite one another, the inner surfaces of the first and second plates facing one another. The advantage of this is that the information concerning the object temperature obtained by using the first plate will be largely independent of the information regarding the object temperature obtained by using the second plate. Consequently, the measuring accuracy of the system will further increase.

Preferably, the second plate is further provided with upright side walls which extend from the inner surface of the second plate in the direction of the first plate, the first plate being situated within a space enclosed by the side walls of the second plate and the first plate being situated, in use, between the second plate and the object. Consequently, the heat flow from the first plate to the surroundings will at least approximately be equal to zero. A physical consequence of this is that the information obtained from the first plate and the information obtained from the second plate are largely independent of one another, so that the measuring accuracy of the system will increase.

According to a very advantageous embodiment of the temperature measuring system, the control unit includes a Kalman filter for determining the object temperature ($T_v$) on the basis of the first and second sensor signals. Use of the Kalman filter enables the object temperature to be so determined that it is possible to take into account all the relevant heat transfer coefficients between the object, the first plate, the second plate and the surroundings and in addition the thermal capacities of the first and second plates.

More particularly, the Kalman filter is dimensioned on the basis of a model having at least three state variables which are respectively formed by the temperature ($T_{p1}$) of the first plate, the temperature ($T_{p2}$) of the second plate, the object temperature ($T_v$) and the ambient temperature $T_o$ of the sensor unit, and by measured quantities formed by the temperature ($T_{p1}$) of the first plate and the temperature ($T_{p2}$) of the second plate.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
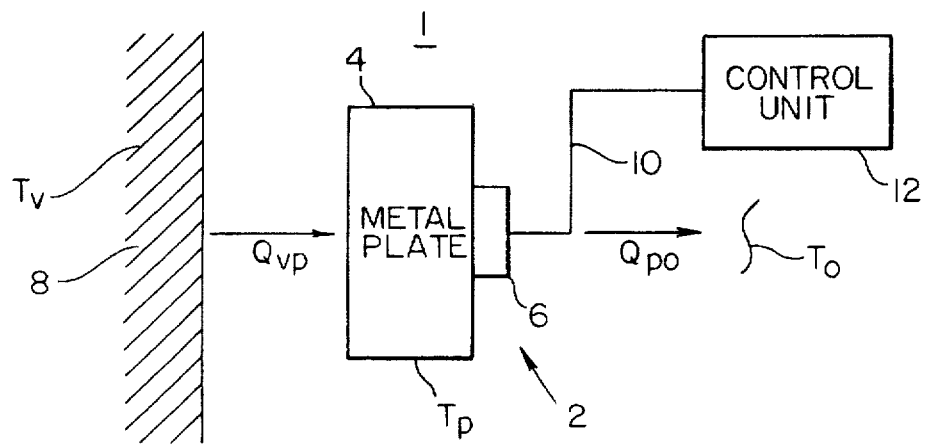
FIG. 1 shows a known temperature measuring system.
Figure 2:
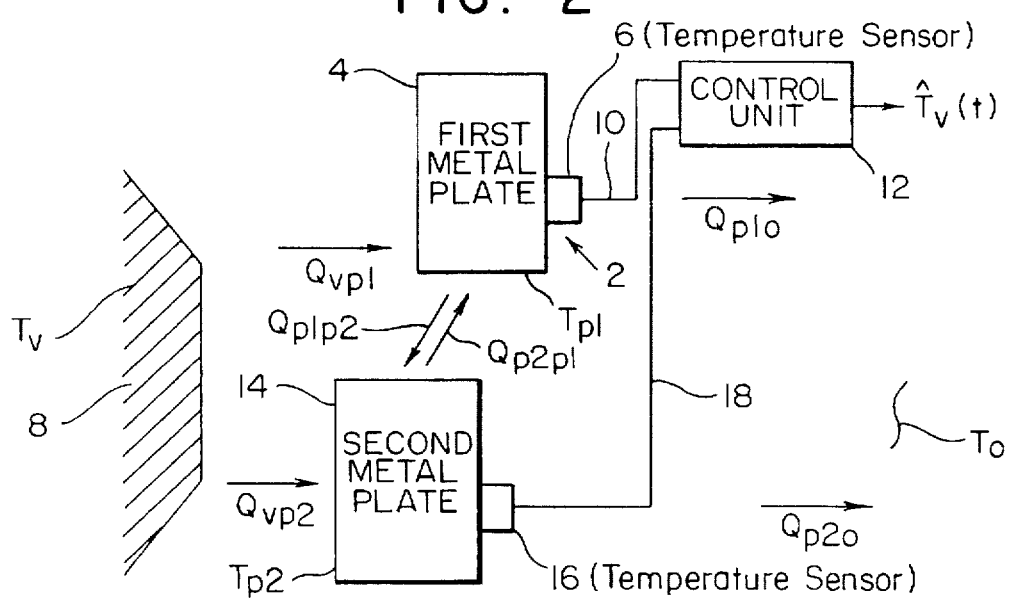
FIG. 2 is a first embodiment of a temperature measuring system according to the invention.

FIG. 2 shows a temperature measuring system 7 according to the invention, wherein components which correspond to components of FIG. 1 have the same reference numbers as used in FIG. 1.

As will be apparent from FIG. 2, the sensor unit 2 is provided with a first plate 4 on which a first temperature-sensitive sensor 6 is disposed to produce first sensor signals which represent the temperature ($T_{p1}$) of the first plate 4. The sensor unit 2 is also provided with a second plate 14 spaced from the first plate 4 and having a second temperature-sensitive sensor 16 disposed thereon to produce second sensor signals representing the temperature ($T_{p2}$) of the second plate 14.

The first and second sensor signals are fed via lines 10 and 18, respectively, to a control unit 12 which processes these signals in combination to determine the object temperature ($T_v$).

On the basis of the law of conservation of energy, the following applies for the temperature $T_{p1}$:

$$C_{Tp1}\frac{dT_{p1}}{dt} = Q_{vp1} - Q_{p10} + Q_{p2p1}. \tag{5}$$

Here $C_{Tp1}$ is the thermal capacity of the first plate 4, $T_{p1}$ the temperature of the first plate 4, $Q_{vp1}$ the heat flow from the object 8 to the first plate 4, $Q_{p10}$ the heat flow from the first plate 4 to the surroundings and $Q_{p2p1}$ the heat flow from the second plate 14 to the first plate 4.

Similarly, on the basis of the law of conservation of energy, the following applies for the second plate:

$$C_{Tp2}\frac{dT_{p2}}{dt} = Q_{vp2} - Q_{p20} + Q_{p1p2}. \tag{6}$$

Here, $C_{Tp2}$ is the thermal capacity of the second plate 14, $T_{p2}$ is the temperature of the second plate 14, $Q_{vp2}$ is the heat flow from the object 8 to the second plate 14, $Q_{p20}$ is the heat flow from the second plate 14 to the surroundings, and $Q_{p1p2}$ is the heat flow from the first plate 4 to the second plate 14 where $Q_{p1p2}=-Q_{p2p1}$. Once again, as discussed in connection with FIG. 1, the following assumptions have been made (in principle, other assumptions are possible, e.g. a nonlinear relationship between heat flows on the one hand and temperatures on the other):

$$Q_{vp1}=G_{vp1}(T_v-T_{p1}) \tag{7}$$

$$Q_{p10}=G_{0p1}(T_{p1}-T_0) \tag{8}$$

$$Q_{p2p1}=-G_{p1p2}(T_{p1}-T_{p2}) \tag{9}$$

$$Q_{vp2}=G_{vp2}(T_v-T_{p2}) \tag{10}$$

$$Q_{p20}=G_{0p2}(T_{p2}-T_0) \tag{11}$$

where $G_{vp1}$ represents the thermal conductivity coefficient of object 8 to the first plate 4; $G_{0p1}$ represents the thermal conductivity coefficient of the surroundings to the first plate 4; $G_{p1p2}$ represents the thermal conductivity coefficient of the first plate 4 to the second plate 14; $G_{vp2}$ represents the thermal conductivity coefficient of object 8 to the second plate 14; and $G_{0p2}$ represents the thermal conductivity coefficient of the surroundings to the second plate 14.

Substitution of formulae 7 to 11 in formulae 5 and 6 gives the following:

$$C_{Tp1}\frac{dT_{p1}}{dt} = G_{vp1}(T_v - T_{p1}) + G_{0p1}(T_0 - T_{p1}) + G_{p1p2}(T_{p2} - T_{p1}) \tag{12}$$

$$C_{Tp2}\frac{dT_{p2}}{dt} = G_{vp2}(T_v - T_{p2}) + G_{0p2}(T_0 - T_{p2}) + G_{p1p2}(T_{p1} - T_p) \tag{13}$$

Formulae 12 and 13 represent the sensor model. Derivation of the sensor model is based on the assumption that the temperature of the first plate 4 is the same throughout and that the temperature of the second plate 14 is the same throughout. It has also been assumed that the thermal capacity of the first and second plates 4, 14 is many times greater than the thermal capacity of the air between the object 8, the first plate 4, and the second plate 14. Finally, it has been assumed that the first and second temperature-sensitive sensors 6, 16 respectively measure the temperature of the first and second plates 4, 14 accurately. The sensor model includes two linear differential equations with two unknowns $T_v$ and $T_o$. Generally, such equations can be solved if they are independent. Formulae 12 and 13 can be converted to the following in the static case where the temperatures of the first plate 4 and second plate 14 are unchanging such that $dT_{p1}/dt=0$ and $dT_{p2}/dt=0$:

$$(G_{vp1}+G_{0p1}+G_{p1p2})T_{p1}-G_{p1p2}T_{p2}=G_{vp1}T_v+G_{0p1}T_0 \tag{14}$$

$$(G_{vp2}+G_{0p2}+G_{p1p2})T_{p2}-G_{p1p2}T_{p1}=G_{vp2}T_v+G_{0p2}T_0 \tag{15}$$

Equations 14 and 15 form two linear equations with two unknowns $T_v$ and $T_o$. The unknowns $T_v$ and $T_o$ can be solved from these equations if they are independent, e.g. if the determinant of the matrix G is not equal to 0, where:

$$G = \begin{pmatrix} G_{vp1} & G_{0p1} \\ G_{vp2} & G_{0p2} \end{pmatrix} \tag{16}$$

On the basis of physical considerations, the determinant of the matrix G will generally not be equal to 0. The unknowns $T_v$ and $T_o$ can be solved more accurately in proportion as the determinant of the matrix G is closer to the number 1. The determinant is therefore an analog index of independence from the matrix.

In FIG. 2, the first and second plates 4, 14 are disposed at different distances from the object 8. This means that the first and second plates 4, 14 will generally make different "observations" from one another. This implies that the equations 14 and 15 will not be dependent on one another. Also, the fact that the second plate 14 in this example has different dimensions from the first plate 4 may contribute to equations 14 and 15 being independent of one another.

Preferably, the control unit 12 contains a Kalman filter for determining the object temperature $T_v$ on the basis of the first and second sensor signals. As will be explained hereinafter, the Kalman filter can be so dimensioned as to generate a solution for the equations 12 and 13. This dimensioning can be carried out as follows: first of all, with regard to the filter design, it is assumed that the object temperature $T_v$ and the ambient temperature $T_o$ do not change:

$$\frac{dT_v}{dt} = 0 \tag{17}$$

$$\frac{dT_0}{dt} = 0 \tag{18}$$

This means that the object temperature $T_v$ and the ambient temperature $T_o$ can be interpreted as state variables of the sensor system defined by the formulae 12 and 13.

If the object 8 is, for example, a heated roller or a heated endless moving belt of a copying machine or a printer, this assumption need not generally be true. The temperature variations of the surroundings and the object are then generally less than 20° C. per minute, so that in that case too the equations 17 and 18 can be assumed as sufficiently valid. Apart from the temperature $T_v$ and $T_o$, the temperatures $T_{p1}$ and $T_{p2}$ can also be interpreted as state variables of the sensor model. The equations 12 and 13 can then be re-written as follows:

$$\dot{x}_M(t) = A\, \bar{x}_M(t) \tag{19}$$

$$\bar{y}_M(t) = \begin{pmatrix} T_{p1} \\ T_{p2} \end{pmatrix} \tag{20}$$

$$\bar{y}_M(t) = c\, \bar{x}_M(t) \tag{21}$$

where $$\bar{x}_M(t) = \begin{pmatrix} T_{p1} \\ T_{p2} \\ T_v \\ T_0 \end{pmatrix} \tag{22}$$

and $$C = \begin{pmatrix} 1 & 0 & 0 & 0 \\ 0 & 1 & 0 & 0 \end{pmatrix} \tag{23}$$

and A=4×4 system matrix. On the basis of the assumptions according to equations 17 and 18, the coefficients of the bottom two rows of the matrix A will be equal to zero. If it is also assumed that the heat flow from the first plate to the surroundings $Q_{p10}$ is equal to zero, then it is a simple matter to derive the following for the matrix A:

$$A = \begin{pmatrix} \frac{G_{vp1} + G_{p1p1}}{C_{Tp1}} & \frac{-G_{p1p1}}{C_{Tp1}} & \frac{-G_{vp1}}{C_{Tp1}} & 0 \\ \frac{-G_{p1p2}}{C_{Tp2}} & \frac{-G_{0p2} + G_{vp2} + G_{p1p2}}{C_{Tp2}} & \frac{-G_{vp2}}{C_{Tp2}} & \frac{+G_{0p2}}{C_{Tp2}} \\ 0 & 0 & 0 & 0 \\ 0 & 0 & 0 & 0 \end{pmatrix} \quad (24)$$

However, it is not essential to make the latter assumption ($Q_{p10}=0$). Generally, all the coefficients of the top row will accordingly not be equal to zero. The possibilities outlined hereinafter for determining the value of the coefficients of the matrix can be applied generally, even if the assumption $Q_{p10}=0$ is not made.

The differences between the values $$\bar{x}_M(t)$$

and $$\bar{y}_M(t)$$

which form a solution of the model equations 19–22 and the actual values $$\bar{x}(t)$$

of the state variables and the assumed values $$\bar{y}(t)$$

of the initial variables are due to two reasons: model errors and measurement errors. The model errors can be discounted in an unknown term $$\bar{w}(t)$$

by requiring the actual state quantities $$\bar{x}(t)$$

satisfying the following:

$$\bar{x}(t)=A\bar{x}(t)+\bar{w}(t) \quad (25)$$

The following applies for the model error:

$$\bar{w}(t)$$

More particularly, $$\bar{w}(t) = \begin{pmatrix} w_1(t) \\ w_2(t) \\ w_3(t) \\ w_4(t) \end{pmatrix} \quad (26)$$

where $w_1(t)$, $w_2(t)$, $w_3(t)$ and $w_4(t)$ respectively represent the error introduced by the fact that not all the physical assumptions made are completely correct in the model according to formula 19. In this connection, mention is made of system noise (or interference).

The measurements errors are discounted in an unknown term $$\bar{v}(t)$$

by requiring the following:

$$\bar{Y}(t) = \begin{pmatrix} T_{p1} \\ T_{p2} \end{pmatrix} + \bar{v}(t) = C\bar{x}(t) + \bar{v}(t) \quad (27)$$

Here, $$\bar{y}(t)$$

represents the observed variables including the measuring error.
Also, $$\bar{v}(t) = \begin{pmatrix} v_1(t) \\ v_2(t) \end{pmatrix} \quad (28)$$

where $v_1(t)$ is the measuring error of the first temperature-sensitive sensor 6 and $v_2(t)$ the measuring error of the second temperature-sensor 16. In this connection, observation noise (measuring noise) is involved in the case of $$\bar{v}(t).$$

The coefficients of the system matrix A are directly related to the heat transfer coefficients of the equations 12 and 13. In order to determine the coefficients of the system matrix A and, hence, also the heat transfer coefficients, the temperature $T_v$ of the object and the ambient temperature $T_o$ per unit of time can be measured once, e.g. by using an infrared camera. At the same time, the temperatures $T_{p1}$ of the first plate 4 and $T_{p2}$ of the second plate 14 per unit of time can be measured by using the temperature-sensitive sensor 6 and the temperature-sensitive sensor 16, respectively.

This measurement results in exactly assumed measurements $$x_m(t)=x(t)$$

which can be expressed as follows:

$$\bar{x}_m(t) = \begin{pmatrix} T_{p1m} \\ T_{p2m} \\ T_{vm} \\ T_{0m} \end{pmatrix} \quad (29)$$

The coefficients of the matrix A can be determined by minimalizing the following criterion for the value J:

$$J=E(|\bar{x}_m(t)-\bar{x}_M(t)|^2=\text{minimal}=E(\bar{w}^T(t)\bar{w}(t)) \quad (30)$$

where E is the notation known per se for an expected value and $$\bar{x}_M(t)$$

is the value following from the sensor model according to formula 19.

To determine the coefficients of the matrix A, use can be made of the assumptions according to formula 24. However, it is also possible to determine the coefficients of the matrix A in accordance with formula 30, but without any assumption for the coefficients of the system matrix A. On the basis of the assumptions according to equations 17 and 18, the coefficients of the bottom two rows of the matrix A will be initially selected as equal to zero. In the literature, there are also other ways of determining the coefficients of the matrix A, e.g. by means of "extended" or "adaptive" filtering. The method outlined above in accordance with formula 30 is, therefore, only one possible method of determining these coefficients.

Figure 3:
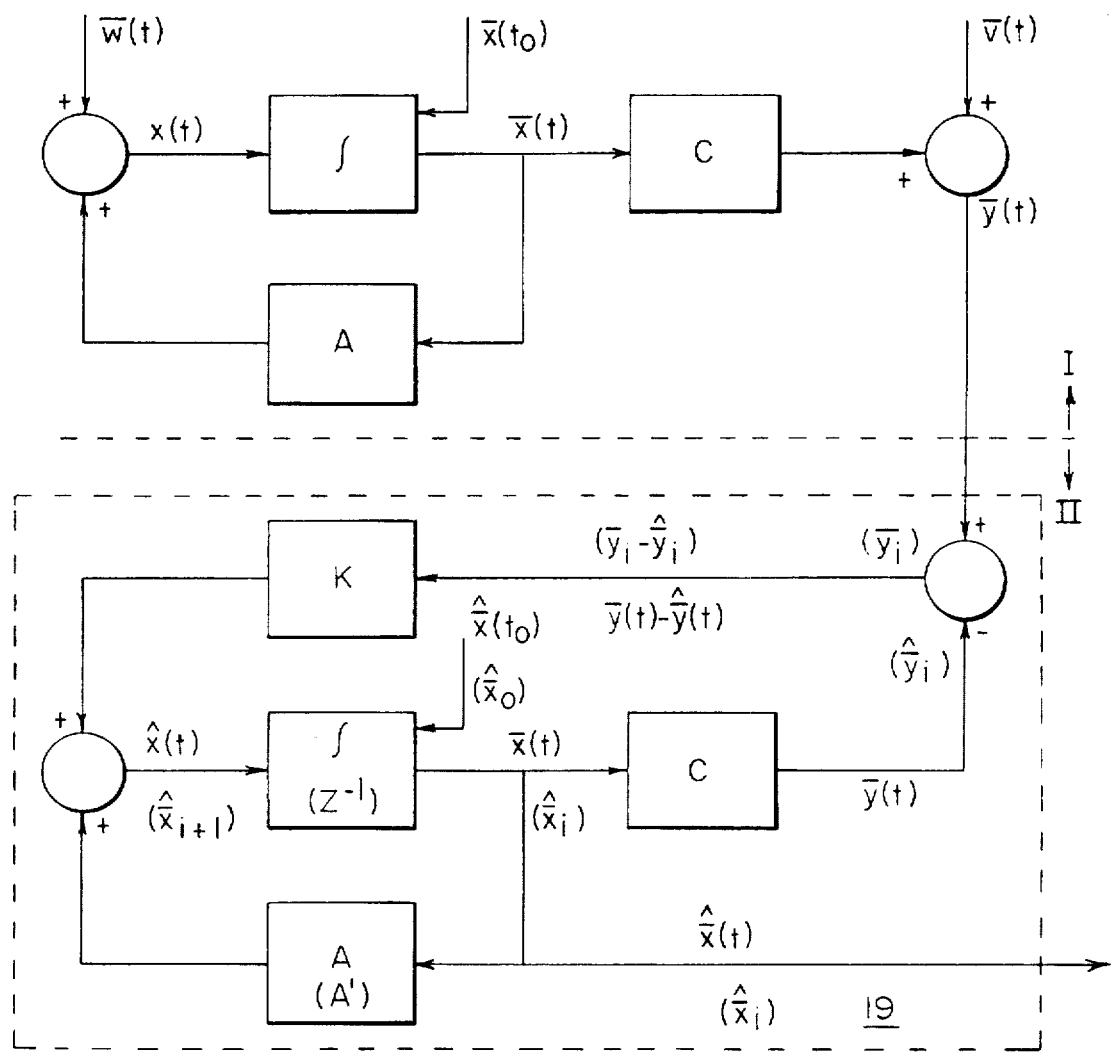
FIG. 3 is one possible embodiment of a Kalman filter of the temperature measuring system according to FIGS. 2 or 5.

After the coefficients of the matrix A have been determined as described above, the Kalman filter of the control unit 12 can be dimensioned as follows. For this purpose, FIG. 3 is a diagram showing the Kalman filter 19. The part I situated above the horizontal broken line corresponds to the actual system and the part II situated beneath the broken line corresponds to the Kalman filter 19.

In the diagram of FIG. 3, $$\bar{x}(t_0)$$

represents the initial state of $$\bar{x}(t)$$

at time t0;

$$\hat{x}(t_0)$$

represents the estimated initial state of x(t);

$$\bar{x}(t)$$

represents the estimated state of x(t);

$$\dot{x}(t)$$

represents the fluctuation of x(t);

$$\dot{\hat{x}}(t)$$

represents the estimated fluctuation of x(t);

$$\hat{y}(t)$$

represents the estimated y(t); and
K represents the 2×4 amplification matrix.

The following parameters should also be dimensioned in the Kalman filter 19 according to FIG. 3: the estimated initial state $$\hat{x}(t_0)$$

and the coefficients of the amplification matrix K. An initial estimate of $T_v$ and $T_o$ can be obtained, for example, by solving the equations 12 and 13 for the static situation. As an initial estimate for $T_{p1}$ and $T_{p2}$, the measurements at t=0 are a good choice. From this, the following applies as an initial estimate for $T_v$ and $T_o$:

$$\begin{pmatrix} T_0 \\ T_v \end{pmatrix}_{t=0} = G^{-1} \begin{pmatrix} (G_{vp1} + G_{0p1} + G_{p1p2})T_{p1} - G_{p1p2} & T_{p2} \\ (G_{vp2} + G_{0p2} + G_{p1p2})T_{p2} - G_{p1p2} & T_{p1} \end{pmatrix}_{t=0} \quad (31)$$

With this the estimated initial state $$\hat{x}(t_0)$$

is also known.

The choice of the filter parameters, i.e. the coefficients of the matrix K, is to some extent arbitrary. The Kalman filter theory provides a method of arriving at a choice for the matrix K on the basis of known assumed statistical properties of $$\bar{w}(t)$$

and $$\bar{v}(t);$$

i.e. a normal (Gaussian) probability density distribution with known variations $$E(\bar{w}(t)\bar{w}(t)^T)$$

and $$E(\bar{v}(t)\bar{v}(t)^T).$$

Optimum values of these coefficients, which are accompanied by advantages to be explained in detail hereinafter, can accordingly be estimated by minimizing the following criterion J':

$$J'=E(|\bar{x}_m(t)-\hat{\bar{x}}(t)|^2)=\text{minimal} \quad (32)$$

Here, $$\bar{x}_m(t)$$

can be measured once with exactly assumed sensors as discussed hereinbefore. This minimalization can be carried out in manner known per se by using commercial computer programs. All the filter parameters are now determined and the control unit will give a reliable value $$\hat{y}$$

The latter can also be regarded as follows. From the configuration of the Kalman filter according to FIG. 3 the following applies:

$$\dot{\hat{\bar{x}}}(t)=A\hat{\bar{x}}(t)+K(y(t)-\hat{\bar{y}}(t)) \quad (33)$$

Also:

$$\hat{\bar{y}}(t)=C\hat{\bar{x}}(t) \quad (34)$$

so that the substitution of equation 34 in equation 33 teaches that $$\dot{\hat{\bar{x}}}(t)=(A-KC)\hat{\bar{x}}(t)+Ky(t) \quad (35)$$

If formula 35 is then deducted from formula 25, $$\bar{y}(t)$$

being substituted by means of formula 27, then the following applies:

$$\dot{\bar{e}}(t)=(A-KC)\bar{e}(t)+\bar{w}(t)-K\bar{v}(t) \quad (36)$$

where $$\bar{e}(t)=\bar{x}(t)-\hat{\bar{x}}(t) \quad (37)$$

It is apparent from formula 36 that the enlargement of the matrix K causes the error e(t) to converge rapidly towards 0. Even if the initial state is selected in reverse form, the error will finally converge towards zero. On the other hand, an enlargement of K also results in a stronger reaction to the measuring error:

$$\bar{v}(t)$$

This means that the above-described optimal choice of K includes a compromise which is dependent on the relationship between the measuring noise and the system noise. In the literature this choice is described as a Kalman (Bucy) filter.

Figure 4:
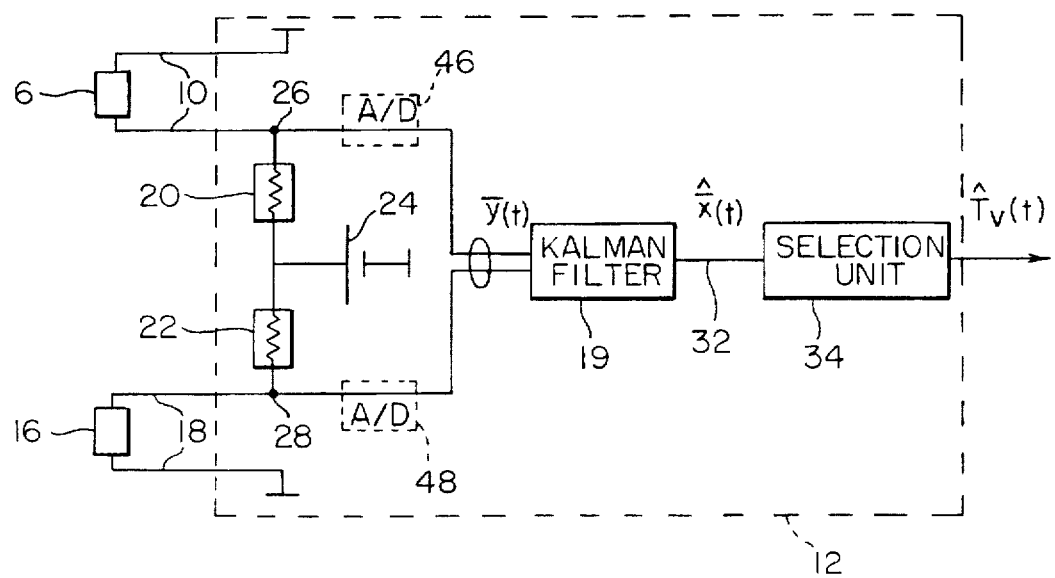
FIG. 4 is one possible embodiment of a control unit of the temperature measuring system according to FIGS. 2 or 5.

The way in which the Kalman filter 19 according to FIG. 3 (part II beneath the broken line) is implemented in the control unit 12 is illustrated with reference to FIG. 4. Here, parts which correspond to one another in FIGS. 2, 3 and 4 have been given the same reference number. Here the temperature-sensitive sensors 6 and 16 are both embodied as NTC resistors. The temperature-sensitive sensor 6 is connected in series with a resistor 20 known per se. Similarly, the temperature-sensitive sensor 16 is connected in series with a resistor 22 known per se. Also, both the series-connected temperature-sensitive sensor 6 and the resistor 20, and also the series-connected temperature-sensitive sensor 16 and resistor 22 are connected in parallel with a common DC supply such as battery 24. The DC voltage at the junction 26 between the temperature-sensitive sensor 6 and the resistor 20 is thus an index of the measured temperature $T_{p1}+v_1(t)$ of the first plate 4. Similarly, the voltage at the junction 28 between the second temperature-sensitive sensor 16 and the resistor 22 is an index of the measured temperature $T_{p2}+v_2(t)$ of the second plate 14. The value thus obtained for $$\bar{y}(t)$$

is fed to the Kalman filter 19. The Kalman filter 19 generates the output signal $$\hat{x}(t),$$

which is fed to a selection unit 34 via line 32. Selection unit 34 selects the component $$\hat{T}_v(t)$$

from the signal $$\hat{x}(t)$$

for further processing.

Figure 5:
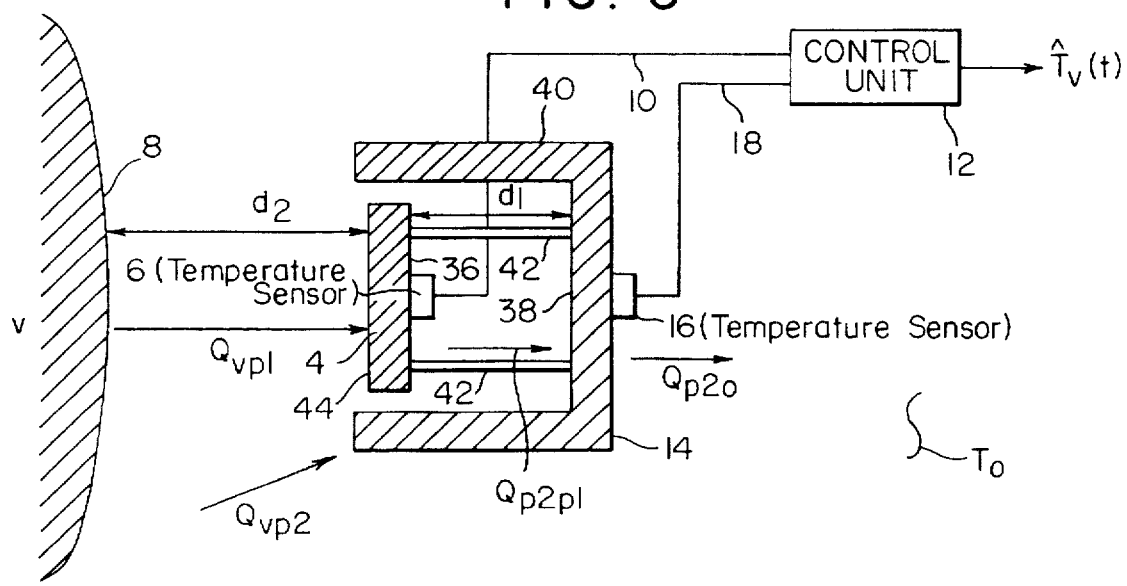
FIG. 5 shows a cross-section of a second embodiment of a temperature measuring system according to the invention.
Figure 6:
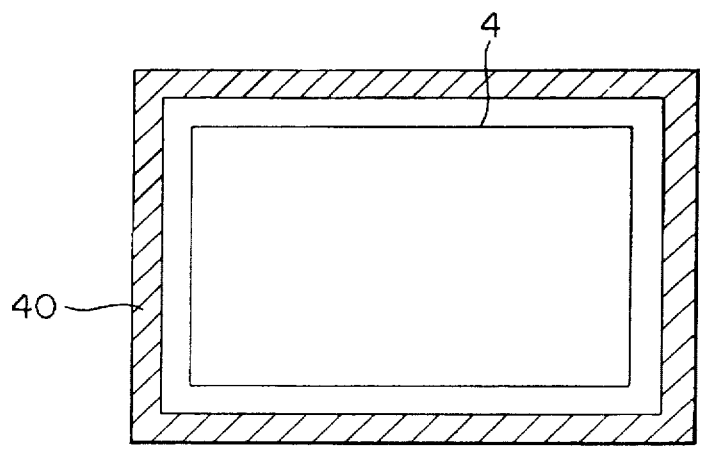
FIG. 6 shows a top-view of the sensor unit of FIG. 5.

FIGS. 5 and 6 show a preferred embodiment of a sensor unit according to the invention. The sensor unit 2 again consists of a first plate 4 and a second plate 14. Here the first and second plates each comprise an inner surface 36, 38 facing one another. The second plate 14 is also provided with side walls 40, which extend from the inner surface 38 of the second plate 14 towards the first plate 4. These side walls 14 have a length such that the first plate is situated within a space enclosed by the side walls 40 of the second plate 14. The first and second plates 4, 14 in this example are interconnected by connecting parts 42. The connecting parts 42 have the property that they conduct at least substantially no heat and are constructed with, for example, plastic.

With its side walls 40, the second plate 14 forms a protective enclosure (cap) which minimalizes the heat exchange between the first plate 4 and the surroundings. If it is assumed that the heat exchange between the first plate 4 and the surroundings ($Q_{p10}$) is negligible, the temperature of the first plate 4 will depend only on the heat exchange with the object 8 for measurement and the second plate 14. In this case, the second plate 14 has a heat exchange with the object 8 ($Q_{vp2}$), the first plate 4 ($Q_{p2p1}$) and the surroundings ($Q_{p20}$).

The relevant heat flows are accordingly indicated in FIG. 5. Again, it is assumed that the temperature of the first plate 4 ($T_{p2}$) is the same throughout the first plate 4 and that the temperature of the second plate 14 is the same throughout the second plate 14. This assumption can readily be satisfied, for example, by making the first and second plates 4, 14 out of a conductive material such as aluminum or copper. It is also assumed that the thermal capacity of the first and second plates 4, 14 is much greater than that of the air between the object, the first plate 4 and the second plate 14. It is not necessary for the thermal capacity of the first and second plates 4, 14, respectively, to be small.

Figure 7:
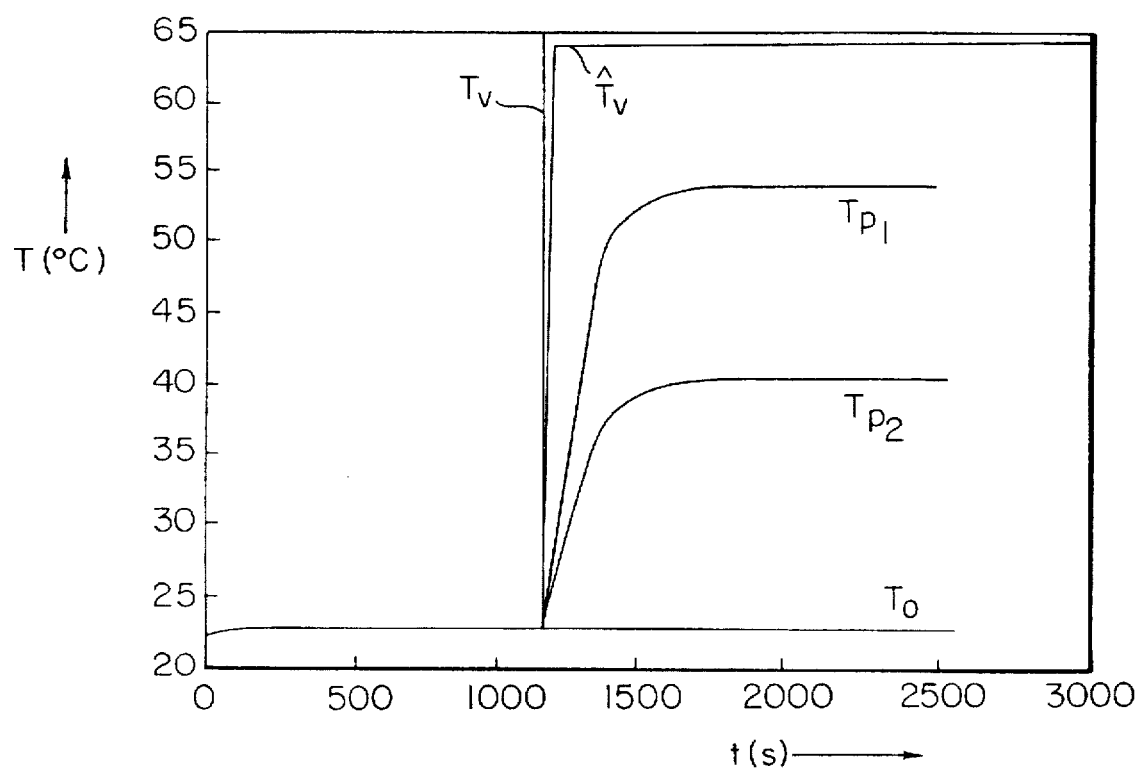
FIG. 7 shows a model response to a stepwise change in the object temperature ($T_v$).

If, as discussed in connection with FIGS. 3 and 4, a Kalman filter is used, the inertia of the sensor unit can be so processed by the Kalman filter that this inertia is eliminated. In other words, if the sensor unit is required to measure a temperature jump, the temperature response of the plate temperatures will be exponential. The Kalman filter so processes these signals that there is again a temperature jump measured at the Kalman filter output. One example of this is shown in FIG. 7.

The above assumptions result in a sensor model according to equations 12 and 13, while $G_{op1}=0$ can be assumed in connection with the fact that it is assumed that the heat exchange between the first plate and the surroundings is negligible. On the basis of this assumption, the components of the system matrix A and of the amplification matrix K can be estimated once as described with reference to FIG. 3.

One advantage of the sensor unit according to FIGS. 5 and 6 is that the object temperature ($T_v$) can be reconstructed very accurately. This is caused particularly by the fact that the heat flow from the first plate to the surroundings ($Q_{p10}$) is negligible. The complexity of the sensor model thus decreases, while the accuracy of the model increases. The temperature of the first plate 4 in that case is, of course, determined solely by the heat flow $Q_{vp1}$ from the object 8 to the first plate 4 and the heat flow $Q_{p1p2}$ from the first plate 4 to the second plate 14.

Another advantage of the embodiment according to FIGS. 5 and 6 is that it is resistant to parameter variations such as variations in air humidity. It is well known that air humidity has a considerable influence on the specific thermal conductivity of air. The numerical values of $G_{xy}$ thus vary with the air humidity. However, it follows from formula 31 that the static temperature distribution does not depend on the absolute values of $G_{xy}$, but on the relationships therebetween. The filter 19 will continue to work well if all the $G_{xy}$ values become, for example, 20% larger or smaller with a constant K.

The accuracy of the sensor unit can be improved further if the heat flow $Q_{vp2}$ from the object 8 to the second plate 14 is small with respect to the heat flow $Q_{vp1}$ from the object 8 to the first plate 4, the heat flow $Q_{p1p2}$ from the first plate 4 to the second plate 14 and the heat flow $Q_{op2}$ from the second plate 14 to the surroundings. In order to improve the accuracy of the sensor unit accordingly, an outer surface 44 of the first plate 4 is preferably black. Of course, this will involve the magnitude of the heat flow $Q_{vp1}$ from the object 8 to the first plate 4 increasing. In addition, a black outer surface 44 makes the sensor unit less sensitive to soiling.

Also, preferably, the inner surfaces 36, 38 of the first and second plates 4, 14 are reflective. This can be achieved, for example, by making the first and second plates from reflective aluminum.

The fact that the accuracy of the system increases as described above is also apparent from formulae 14, 15 and 16. If, for example, the heat flow between the surroundings and the first plate 4 is negligible and if in addition the heat flow from the object to the second plate 14 is small with respect to the remaining heat flows, then the coefficients $G_{op1}$ and $G_{vp2}$ of the matrix G will be small with respect to the coefficients $G_{vp1}$ and $G_{op2}$. Mathematically, this means that the angle between the specific vectors of the matrix G will approach 90°. In the extreme case, if the angle is equal to 90°, the equations 14 and 15 will be quite independent and the accuracy of the sensor system will be optimal with respect to the mechanical construction.

Preferably, the sensor unit is so dimensioned that in use the temperature difference $(T_v-T_{p1})$ between the object 8 and the first plate 4, the temperature difference $(T_{p1}-T_{p2})$ between the first and second plate 4, 14 and the temperature difference $(T_{p2}-T_o)$ between the second plate 14 and the surroundings are approximately equal to one another. These temperature differences are variables in the equations 12 and 13. Since these variables are now approximately all equal, the measuring error amplification in the Kalman filter 19 will be as small as possible.

In the example of FIG. 5, the distance $d_1$ between the first plate 4 and the second plate 14 is approximately equal to twice the distance $d_2$ between the object 8 and the first plate 4. Other distances are feasible, however. What is important is that the first plate 4 is situated entirely within the space enclosed by the second plate 14. In that case, the heat flow $Q_{Op1}$ will be very small. If the distance $d_1$ between the first plate 4 and the second plate 14 is small with respect to the distance $d_2$ between the first plate 4 and the object 8, the influence of a change of the distance $d_2$ between the first plate 4 and the object 8 will be relatively small. This is especially important if the object 8 consists of a heated rotating roller or heated endless belt.

Preferably, the area of the first plate 4 and second plate 14 is approximately 2 cm$^2$ to 20 cm$^2$ and the distance $d_1$ between the first plate 4 and the second plate 14 is about 1 mm to 6 mm. The thickness of the first plate 4 and the second plate 14 is, for example, approximately 0.5 mm. If the plates 4, 14 are too thick, the temperature of the plates 4, 14 will not be the same throughout. If the plates 4, 14 are too thin, the sensor unit becomes too fragile and the thermal capacity of the plates 4, 14 may become too small with respect to the thermal capacity of the air between the object, the first plate 4 and the second plate 14.

The invention is in no way limited to the above exemplified embodiments. For example, the control unit 12 may be provided with a first and second A/D conversion unit 46, 48 as shown in FIG. 4 for sampling and digitizing the first and second sensor signals. In that case, the Kalman filter 19 is a digital filter to which the digitized sensor signals are fed for further processing.

The first and second A/D conversion units 46, 48 can, for example, be constructed with 8-bit resolution. In view of an expected measuring range of 20° to 120° C., the resolution will then be approximately 0.4° C. If, however, 12-bit A/D conversion units are used, the system noise referred to hereinbefore will decrease.

The sampling time of the first and second A/D conversion units 46, 48 is preferably ten times less than the smallest response time to be measured by the sensor unit 2. In this example, $\Delta t = 1.28$ sec can be chosen. The Kalman filter according to FIG. 3, which is thus suitable for processing analog signals, can be of digital construction in manner known per se, as will be explained summarily hereinafter. The following can be derived from formula 25:

$$d\bar{x} = A\bar{x}(t)\cdot dt + \bar{w}(t)\cdot dt \tag{38}$$

If $$\bar{x}_i$$

is the $i^{th}$ sampled digitized value of $$\bar{x},$$

where $\Delta t$ is equal to the sampling time, then the following can be derived from equation 38:

$$\bar{x}_{i+1} - \bar{x}_i = A\bar{x}_i \Delta t + \bar{w}_i \Delta t \tag{39}$$

From equation 39 it simply follows that:

$$\bar{x}_{i+1} = (A\,\Delta t + I)\bar{x}_i + \bar{w}_i \Delta t \tag{40}$$

Equation 40 can be rewritten as follows:

$$\bar{x}_{i+1} = A'\bar{x}_i + \bar{w}'_i \tag{41}$$

Similarly equations 27, 30, 32 and 35 are equivalent to the following equations, which can be used for a digital Kalman filter:

$$\bar{Y}_i = \begin{pmatrix} T_{p1_i} \\ T_{p2_i} \end{pmatrix} + \bar{v}_i = c\,\bar{x}_i + \bar{v}_i \tag{42}$$

$$J = \sum_{i=0}^{n} (\bar{x}_{mi} - x_{Mi})^2 = \text{minimal} \tag{43}$$

$$J' = \sum_{i=0}^{n} (\bar{x}_{mi} - \bar{x}_i)^2 = \text{minimal} \tag{44}$$

$$\bar{x}_{i+1} = (A' - KC)\bar{x}_i + K\bar{y}_i \tag{45}$$

where:

$$A' = \left( \begin{pmatrix} \frac{G_{vp1} + G_{p1p2}}{C_{Tp1}} & \frac{-G_{p1p2}}{C_{Tp1}} & \frac{-G_{vp1}}{C_{Tp1}} & 0 \\ \frac{-G_{p1p2}}{C_{Tp2}} & \frac{-G_{0p2} + G_{vp2} + G_{p1p2}}{C_{Tp2}} & \frac{-G_{vp2}}{C_{Tp2}} & \frac{+G_{0p2}}{C_{Tp2}} \\ 0 & 0 & 0 & 0 \\ 0 & 0 & 0 & 0 \end{pmatrix} \Delta t + \begin{pmatrix} 1 & 0 & 0 & 0 \\ 0 & 1 & 0 & 0 \\ 0 & 0 & 1 & 0 \\ 0 & 0 & 0 & 1 \end{pmatrix} \right)$$

If the sensor unit is constructed in accordance with FIG. 5, and if it is also assumed that the heat flow from the first plate 4 to the surroundings is equal to zero, then it is a simple matter to derive the following applicable to the matrix A':

Finally, the digital version of the Kalman filter is shown in brackets in FIG. 3. Such a digital Kalman filter can be implemented in either software or hardware or a combination of hardware and software as is known in the art.

For the sake of completeness, it should be noted that the term Kalman filter in this context also includes an extended Kalman filter and an adaptive Kalman filter. Also, other choices are possible for a filter design. For example, three state variables can be taken as a basis instead of four. The three state variables of x could, for $$\bar{x}$$

example, be $T_v$, $T_{p1}$ and $T_{p2}$. The fact that heat flows from and to the surroundings are completely ignored in such a model $$(\dot{x}=A\bar{x})$$

can possibly be expressed in somewhat larger values $$\bar{w}(\dot{x}=A\bar{x}+\bar{w}).$$

Non-linear filter algorithms such as are usual in robotics can also be implemented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A temperature measuring system for the contactless determination of an object temperature of at least a part of an object, comprising:

a first plate disposed near the object;

a first temperature-sensitive sensor disposed on said first plate for producing a first sensor signal representing a temperature of said first plate;

a second plate spaced from said first plate and disposed near the object;

a second temperature-sensitive sensor disposed on said second plate for producing a second sensor signal representing a temperature of said second plate; and a control unit receiving the first and second sensor signals and processing the first and second sensor signals in combination with one another to determine the object temperature, wherein said second plate is positioned with respect to said first plate such that if a stable state ratio $(T_o/T_v)$ between an ambient temperature $(T_o)$ of the sensor unit and a temperature $(T_v)$ of the object has a numerator and a denominator that differ from one another, an associated ratio $(T_{p1}/T_{p2})$ between a temperature $(T_{p1})$ of the first plate and a temperature $(T_{p2})$ of the second plate also has a numerator and a denominator that differ from one another.

2. The temperature measuring system according to claim 1, said first and second plates each including an inner surface and an outer surface situated on either side of said first and second plates wherein the inner surfaces of the first and second plates face one another.

3. The temperature measuring system according to claim 1, said first and second plates having a substantially flat shape and positioned substantially parallel to one another.

4. The temperature measuring system according to claim 3, wherein a distance between said first and second plates is approximately 1 mm to 6 mm.

5. The temperature measuring system according to claim 3, wherein an area of said first plate and said second plate is approximately 2 cm² to 20 cm².

6. The temperature measuring system according to claim 2, said second plate including side walls extending from the inner surface of said second plate in the direction of the object, said first plate being situated within a space enclosed by the side walls of said second plate and said first plate being situated between said second plate and the object.

7. The temperature measuring system according to claim 6, wherein a distance between said first and second plates is such that a temperature difference between the object temperature and the temperature of said first plate, the temperature difference between the temperature of said first plate and the temperature of said second plate and the temperature difference between the temperature of said second plate and the temperature of the surroundings are substantially equal to one another.

8. The temperature measuring system according to claim 6, wherein a distance between said first and second plates is approximately equal to twice a distance between said first plate and the object.

9. The temperature measuring system according to claim 2, the inner surfaces of said first and second plates being reflective.

10. The temperature measuring system according to claim 9, the inner surfaces of said first and second plates being made from reflective aluminum.

11. The temperature measuring system according to claim 2, the outer surface of said first plate being black.

12. The temperature measuring system according to claim 1, further comprising:

connecting means for connecting said first and second plates, said connecting means having substantially no thermal conductivity.

13. The temperature measuring system according to claim 1, wherein said first temperature-sensitive sensor is a first temperature-sensitive resistor.

14. The temperature measuring system according to claim 13, wherein said first temperature-sensitive resistor is an NTC resistor.

15. The temperature measuring system according to claim 1, wherein said second temperature-sensitive sensor is a second temperature-sensitive resistor.

16. The temperature measuring system according to claim 15, wherein said second temperature-sensitive resistor is an NTC resistor.

17. The temperature measuring system according to claim 1, said control unit including a filter for determining the object temperature on the basis of the first and second sensor signals.

18. The temperature measuring system according to claim 17, wherein said filter is a Kalman filter.

19. The temperature measuring system according to claim 17, said filter being dimensioned on the basis of a model having at least three state variables which are respectively formed by the temperature $(T_{p1})$ of said first plate, the temperature $(T_{p2})$ of said second plate and the object temperature $(T_v)$ and with measured variables formed by the temperature $(T_{p1})$ of said first plate and the temperature $(T_{p2})$ of said second plate.

20. The temperature measuring system according to claim 17, said filter being dimensioned on the basis of a model having state variables formed by the temperature $(T_{p1})$ of the first plate, the temperature $(T_{p2})$ of the second plate, the object temperature $(T_v)$ and the ambient temperature $(T_0)$ of the sensor unit and with measured variables which are formed by the temperature $(T_{p1})$ of the first plate and the temperature $(T_{p2})$ of the second plate.

21. The temperature measuring system according to claim 20, the model being based on the following differential equations:

$$C_{Tp2}\frac{dT_{p2}}{dt} = G_{vp2}(T_v - T_{p2}) + G_{0p2}(T_0 - T_{p2}) + G_{p1p2}(T_{p1} - T_{p2})$$

$$C_{Tp1}\frac{dT_{p1}}{dt} = G_{vp1}(T_v - T_{p1}) + G_{0p1}(T_0 - T_{p1}) + G_{p1p2}(T_{p2} - T_{p1})$$

where $C_{Tp1}$ is the thermal capacity of the first plate;
$C_{Tp2}$ is the thermal capacity of the second plate;
$G_{vp1}$ is the heat transfer coefficient between the object and the first plate;
$G_{vp2}$ is the heat transfer coefficient between the object and the second plate;
$G_{0p1}$ is the heat transfer coefficient between the surroundings and the first plate;
$G_{0p2}$ is the heat transfer coefficient between the surroundings and the second plate;
$G_{p1p2}$ is the heat transfer coefficient between the first plate and the second plate;
$T_v$ is the object temperature to be determined;
$T_0$ is the ambient temperature;
$T_{p1}$ is the temperature of the first plate; and
$T_{p2}$ is the temperature of the second plate.

22. The temperature measuring system according to claim 21, wherein the model assumes that the heat transfer coefficient $G_{Op1}$ from the surroundings to said first plate is negligible.

23. The temperature measuring system according to claim 17, said control unit including an A/D conversion unit for sampling and digitizing the first and second sensor signals, and wherein the filter is a digital filter to which the digitized sensor signals are fed.

24. An image reproduction machine provided with a temperature measuring system according to claim 1 wherein the object is a roller or belt.

25. A sensor unit for contactless determination of an object temperature of at least part of an object, comprising:

a first plate disposed near the object;

a first temperature-sensitive sensor disposed on said first plate for producing a first sensor signal representing a temperature of said first plate;

a second plate spaced from said first plate and disposed near the object; and a second temperature-sensitive sensor disposed on said second plate for producing a second sensor signal representing a temperature of said second plate, wherein said second plate is positioned with respect to said first plate such that if a stable state ratio $(T_o/T_v)$ between an ambient temperature $(T_o)$ of the sensor unit and a temperature $(T_v)$ of the object has a numerator and a denominator that differ from one another, an associated ratio $(T_{p1}/T_{p2})$ between a temperature $(T_{p1})$ of the first plate and a temperature $(T_{p2})$ of the second plate also has a numerator and a denominator that differ from one another.

26. The sensor unit according to claim 25, said first and second plates each including an inner surface and an outer surface situated on either side of said first and second plates, and wherein the inner surfaces of the first and second plates face one another.

27. The sensor unit according to claim 26, said second plate including side walls extending from the inner surface of said second plate in the direction of the object, said first plate being situated within a space enclosed by the side walls of said second plate and said first plate being situated between said second plate and the object.

28. The sensor unit according to claim 27, wherein a distance between first and second plates is such that a temperature difference between the object temperature and the temperature of said first plate, the temperature difference between the temperature of said first plate and the temperature of said second plate and the temperature difference between the temperature of said second plate and the temperature of the surroundings are substantially equal to one another.

29. The sensor unit according to claim 27, wherein a distance between said first and second plates is approximately equal to twice a distance between said first plate and the object.

30. The sensor unit according to claim 26, the inner surfaces of said first and second plates being reflective.

31. The sensor unit according to claim 30, the inner surfaces of said first and second plates being made from reflective aluminum.

32. The sensor unit according to claim 26, the outer surface of said first plate being black.

33. The sensor unit according to claim 25, said first and second plates having a substantially flat shape and positioned substantially parallel to one another.

34. The sensor unit according to claim 33, wherein a distance between said first and second plates is approximately 1 mm to 6 mm.

35. The sensor unit according to claim 33, wherein an area of said first plate and said second plate is approximately 2 cm$^2$ to 20 cm$^2$.

36. The sensor unit according to claim 25, further comprising:

connecting means for connecting said first and second plates, said connecting means having substantially no thermal conductivity.

37. The sensor unit according to claim 25, wherein said first temperature-sensitive sensor is a first temperature-sensitive resistor.

38. The sensor unit according to claim 37, wherein said first temperature-sensitive resistor is an NTC resistor.

39. The sensor unit according to claim 25, wherein said second temperature-sensitive sensor is a second temperature-sensitive resistor.

40. The sensor unit according to claim 39, wherein said second temperature-sensitive resistor is an NTC resistor.

41. A method for the contactless determination of an object temperature of at least a part of an object, comprising the steps of:

disposing a first plate near the object;

producing a first sensor signal representing a temperature of the first plate;

disposing a second plate spaced from the first plate and near the object;

producing a second sensor signal representing a temperature of said second plate; and processing the first and second sensor signals in combination with one another to determine the object temperature, wherein the second plate is positioned with respect to the first plate such that if a stable state ratio $(T_o/T_v)$ between an ambient temperature $(T_o)$ of the sensor unit and a temperature $(T_v)$ of the object has a numerator and a denominator that differ from one another, an associated ratio ($T_{p1}/T_{p2}$) between a temperature ($T_{p1}$) of the first plate and a temperature ($T_{p2}$) of the second plate also has a numerator and a denominator that differ from one another.

42. The method according to claim 41, said processing step including a filtering step for determining the object temperature on the basis of the first and second sensor signals.

43. The method according to claim 42, said filtering step including a Kalman filtering step.

44. The method according to claim 42, said filtering step including a filter being dimensioned on the basis of a model having at least three state variables which are respectively formed by the temperature ($T_{p1}$) of the first plate, the temperature ($T_{p2}$) of the second plate and the object temperature ($T_v$) and with measured variables formed by the temperature ($T_{p1}$) of the first plate and the temperature ($T_{p2}$) of the second plate.

45. The method according to claim 42, said filtering step including a filter being dimensioned on the basis of a model having state variables formed by the temperature ($T_{p1}$) of the first plate, the temperature ($T_{p2}$) of the second plate, the object temperature ($T_v$) and the ambient temperature ($T_0$) of the sensor unit and with measured variables which are formed by the temperature ($T_{p1}$) of the first plate and the temperature ($T_{p2}$) of the second plate.

46. The method according to claim 45, the model used in said filtering step being based on the following differential equations:

$$C_{Tp2}\frac{dT_{p2}}{dt} = G_{vp2}(T_v - T_{p2}) + G_{0p2}(T_0 - T_{p2}) + G_{p1p2}(T_{p1} - T_{p2})$$

-continued $$C_{Tp1}\frac{dT_{p1}}{dt} = G_{vp1}(T_v - T_{p1}) + G_{0p1}(T_0 - T_{p1}) + G_{p1p2}(T_{p2} - T_{p1})$$

where $C_{Tp1}$ is the thermal capacity of the first plate;

$C_{Tp2}$ is the thermal capacity of the second plate;

$G_{vp1}$ is the heat transfer coefficient between the object and the first plate;

$G_{vp2}$ is the heat transfer coefficient between the object and the second plate;

$G_{0p1}$ is the heat transfer coefficient between the surroundings and the first plate;

$G_{0p2}$ is the heat transfer coefficient between the surroundings and the second plate;

$G_{p1p2}$ is the heat transfer coefficient between the first plate and the second plate;

$T_v$ is the object temperature to be determined;

$T_0$ is the ambient temperature;

$T_{p1}$ is the temperature of the first plate; and $T_{p2}$ is the temperature of the second plate.

47. The method according to claim 42, further comprising the steps of sampling and digitizing the first and second sensor signals, and wherein said filtering step receives the digitized first and second sensor signals and performs digital filtering.

* * * * *